(12) United States Patent
Shinomiya

(10) Patent No.: US 7,535,587 B2
(45) Date of Patent: May 19, 2009

(54) NETWORK FACSIMILE APPARATUS THAT TRANSMITS E-MAIL INDICATING TRANSMISSION CONTROL INFORMATION THROUGH A NETWORK

(75) Inventor: Kiyohiko Shinomiya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 742 days.

(21) Appl. No.: 10/171,931

(22) Filed: Jun. 14, 2002

(65) Prior Publication Data

US 2003/0016394 A1 Jan. 23, 2003

(30) Foreign Application Priority Data

Jun. 18, 2001 (JP) ............................ 2001-183700
Mar. 8, 2002 (JP) ............................ 2002-063330

(51) Int. Cl.
*G06F 3/12* (2006.01)
*G06K 15/00* (2006.01)
*H04N 1/00* (2006.01)
*H04M 11/00* (2006.01)

(52) U.S. Cl. ..................... 358/1.15; 358/1.16; 358/400; 358/402; 379/100.01; 379/100.08

(58) Field of Classification Search ................. 358/1.15, 358/1.16, 402, 468, 400; 379/100.01, 100.08
See application file for complete search history.

(56) References Cited

U.S. PATENT DOCUMENTS 6,016,430 A 1/2000 Shinomiya

| | | |
|---|---|---|
| 6,088,125 A * | 7/2000 | Okada et al. ............... 358/405 |
| 6,545,768 B1 * | 4/2003 | Matsubara et al. ......... 358/1.15 |
| 2002/0054335 A1 * | 5/2002 | Sekiguchi .................. 358/1.15 |

FOREIGN PATENT DOCUMENTS

| EP | 0848539 A1 | 6/1998 |
|---|---|---|
| EP | 1041809 A2 | 10/2000 |
| EP | 1087578 A2 | 3/2001 |
| JP | 10-65866 | 3/1998 |
| JP | 2000-183949 | 6/2000 |

OTHER PUBLICATIONS

U.S. Appl. No. 09/656,414, filed Sep. 6, 2000.
U.S. Appl. No. 09/665,499, filed Sep. 19, 2000.

* cited by examiner

*Primary Examiner*—Edward L Coles
*Assistant Examiner*—Thomas J Lett
(74) *Attorney, Agent, or Firm*—Cooper & Dunham, LLP

(57) ABSTRACT

A network facsimile apparatus, including a LAN interface unit, a facsimile interface unit, a memory unit, and a control unit, transmits image information received as e-mail through a computer network to another facsimile apparatus through a public channel, stores an e-mail address of a backup transmission destination with respect to the facsimile transmission in a memory unit for storing e-mail addresses beforehand. When the facsimile transmission is completed, the network facsimile apparatus generates communication control information and prepares an e-mail message that indicates the communication control information therein to transmit the e-mail message to the backup transmission address stored in the memory unit. Accordingly, a user can easily and readily ensure the result of the facsimile transmission by receiving the e-mail from the network facsimile apparatus.

22 Claims, 16 Drawing Sheets

FIG.4

```
From: xxxx <xxx@xxx.com>
To: backup@*****.co.jp
Date: Mon, 31 Jul 2000 06:20:10 +0900
Subject: [IFAX] 05/17 14:26, G3, 000-111-3333, 4444
Recieved: from xxx.co.jp (8.6.11 + 2.4W/3.3W9-1.0S8sun) with ESMTP id GAA17297
for < xxx@xxx.co.jp> ; Mon, 31 Jul 2000 06:18:19 +0900
Message-Id: <20000073020120.GAA25458@xxx.net>
MIME-Version: 1.0
X-Mailer : E-Magazine Ver.2.00.1
Content-Type: text/plain; charset=iso-2022-jp
Content-Tranfer-Encoding: 7bit
```

FIG.6

```
From: xxxx <xxx@xxx.com>
To: backup@*****.co.jp
Date: Mon, 31 Jul 2000 06:20:10 +0900
Subject: [IFAX] TRANSMISSION CONTROL REPORT, 05/17 14:26, TTI 9507 US, G3, ECM, REGULAR CHARACTER, MEMORY TRANSMISSION, 0' 21", 1 PAGE, OK,
3213
Recieved: from xxx.co.jp (8.6.11 + 2.4W/3.3W9-1.0SBsun) with ESMTP id GAA17297 for < xxx@xxx.xxx.co.jp> :
Mon, 31 Jul 2000 06:18:19 +0900
Message-Id: <20000730212O.GAA25458@xxx.net>
MIME-Version: 1.0
X-Mailer : E-Magazine Ver.2.00.1
Content-Type: text/plain; charset=iso-2022-jp
Content-Tranfer-Encoding: 7bit
```

FIG.8

```
From: xxxx <xxx@xxx.com>
To: backup@*****.co.jp
Date: Mon, 31 Jul 2000 06:20:10 +0900
Subject: [IFAX] TRANSMISSION CONTROL REPORT, 327-329
Recieved: from xxx.co.jp (8.6.11 + 2.4W/3.3W9-1.0S8sun) with ESMTP id GAA17297 for < xxx@xxx.xxx.co.jp> : Mon, 31 Jul 2000 06:18:19 +0900
Message-Id: <200007302120.GAA25458@xxx.net>
MIME-Version: 1.0
X-Mailer : E-Magazine Ver.2.00.1
Content-Type: text/plain; charset=iso-2022-jp
Content-Tranfer-Encoding: 7bit
```

* TRANSMISSION TRANSMISSION CONTROL REPORT   [TT19507US] *   00/08/28 18:18

| DATA/TIME | DESTINATION NAME | MODE | CONDITION | TIME REQUIRED | PAGES | RESULT | DOCUMENT NO. |
|---|---|---|---|---|---|---|---|
| 08/21 12:12 | PC-<LAN>-> | PC FAX | SMALL CHARACTER, MEMORY TRANSMISSION | 0'01" | 2 P | OK | 327 |
| 08/21 12:12 | △△△△,1 US | G3 | ECM, SMALL CHARACTER, MEMORY TRANSMISSION | 0'01" | 2 P | OK | 327 |
| 08/25 11:42 | OOOOO.OOOO | E-MAIL | REGULAR CHARACTER, MEMORY TRANSMISSION | 0'10" | 2 P | — | 328 |
| 08/25 14:27 | OOOOO.OOOO | E-MAIL | REGULAR CHARACTER, MEMORY TRANSMISSION | 0'10" | 1 P | — | 329 |

FIG.10

```
From: xxxx <xxx@xxx.com>
To: backup@*****.co.jp
Date: Mon, 31 Jul 2000 06:20:10 +0900
Subject: [IFAX] TRANSMISSION RESULT REPORT, OK, 327-329
Recieved: from xxx.co.jp (8.6.11 + 2.4W/3.3W9-1.0S8sun) with ESMTP id GAA17297 for < xxx@xxx.xxx.co.jp> : Mon, 31 Jul 2000 06:18:19 +0900
Message-Id: <20000730212O.GAA25458@xxx.net>
MIME-Version: 1.0
X-Mailer : E-Magazine Ver.2.00.1
Content-Type: text/plain; charset=iso-2022-jp
Content-Tranfer-Encoding: 7bit
```

\*\*\* TRANSMISSION RESULT REPORT    [TT19507US]\*\*\*    00/08/28 18:18

RECEPTION TIME: 00/21 12:12

| DOCUMENT NO. | CONDITION | DESTINATION (GROUP) | RESULT | PAGES |
|---|---|---|---|---|
| 122 | SMALL CHARACTER, MEMORY TRANSMISSION | G3: 000-111-2222 | OK | 1/1 |

☐ FAX. tif

FIG.14

```
From: xxxx <xxx@xxx.com>
To: backup@*****.co.jp
Date: Mon, 31 Jul 2000 06:20:10 +0900
Subject: [IFAX] ERROR REPORT, 10-10, 327
Recieved: from xxx.co.jp (8.6.11 + 2.4W/3.3W9-1.0S8sun) with ESMTP id GAA17297 for < xxx@xxx.xxx.co.jp> : Mon, 31 Jul 2000 06:18:19 +0900
Message-Id: <200007302120.GAA25458@xxx.net>
MIME-Version: 1.0
X-Mailer : E-Magazine Ver.2.00.1
Content-Type: text/plain; charset=iso-2022-jp
Content-Tranfer-Encoding: 7bit

*** ERROR MAIL NOTIFICATION (2000, 8028 18:47 ***

NOTIFICATION FROM    △△△△△@artemis, XXXX. OOOOO. co.jp

CAUSE OF ERROR: INVALID FILE (DECODE ERROR)

PLEASE CONFIRM

THANK YOU
```

NETWORK FACSIMILE APPARATUS THAT TRANSMITS E-MAIL INDICATING TRANSMISSION CONTROL INFORMATION THROUGH A NETWORK

BACKGROUND

1. Technical Field

The present disclosure generally relates to a facsimile apparatus, and more particularly, to a facsimile apparatus having a network function for exchanging data through a certain network as well as a facsimile function for exchanging facsimile data through a public communication channel in compliance with a facsimile transmission procedure, the facsimile apparatus being able to receive image information as an attachment to an e-mail message from another apparatus through the network and transmit the image information as facsimile data to another facsimile apparatus through the public communication channel in compliance with the facsimile transmission procedure.

2. Description of the Related Art

Facsimile apparatuses are hitherto used in a stand-alone environment where the apparatuses are not connected to any computer network. The facsimile apparatuses exchange data in compliance with the facsimile communication procedure, ITU-T T.30, defined by the International Telecommunication Unit (ITU).

Recently, facsimile apparatuses that can exchange image information with another apparatus through a computer network such as Local Area Network (LAN) and the Internet have been developed and practically used.

The facsimile apparatus disclosed in the Japanese Laid-open Patent Application No. 10-65866 filed by the same applicant as the present invention is an example of such a facsimile apparatus. This facsimile apparatus includes a local area network communication unit for exchanging data with its counterpart through a local area network connected to the Internet, a public exchange network communication unit for exchanging image information with another facsimile apparatus in compliance with the defined facsimile transmission procedure through a public exchange network, and a telephone number conversion table for storing a telephone number of each destination and a network address of the same.

When transmitting image information, this facsimile apparatus converts a telephone number of each destination into a network address, if stored in the telephone number conversion table thereof, and transmits the image information through the local area network and/or the Internet instead of making a call through the public exchange network.

In response to a receipt of a call from another facsimile apparatus, this facsimile apparatus informs the calling facsimile apparatus of its own computer network address by including the computer network address in the signal to be returned to the calling facsimile apparatus required by the facsimile communication procedure for future communication through the computer network.

The calling facsimile apparatus may include a telephone number conversion table for storing the telephone number of the receiving facsimile apparatus and the computer network address of which the receiving facsimile apparatus informed the calling facsimile apparatus during the initial communication. The calling facsimile apparatus then can transmit image information through the computer network by converting the telephone number of-the receiving facsimile apparatus into the computer network address of the receiving facsimile apparatus.

This calling facsimile apparatus, if a transmission of image information through the computer network fails, makes a call to the designated telephone number and sends the same image information again.

When this calling facsimile apparatus transmits image information through the public exchange network, the calling facsimile apparatus identifies the computer network address of the receiving facsimile apparatus, if contained in a signal returned by the receiving facsimile apparatus, and stores the computer network address of the receiving facsimile apparatus in the telephone number conversion table thereof as a computer network address corresponding to the telephone number.

In the case of the facsimile apparatus according to the invention disclosed in the above Japanese Laid-open Patent Application No. 10-65866, however, it is possible to further improve the network function of the facsimile apparatus.

For example, when the conventional facsimile apparatus receives facsimile data to be transmitted from an apparatus connected to the computer network, the facsimile apparatus does not return any information indicating the result of the facsimile transmission.

SUMMARY

In an aspect of the present disclosure, a network facsimile apparatus is provided that can inform a user who has requested to receive image information of communication control information through a computer network.

To achieve one of the above objects In another aspect of this disclosure, a network facsimile apparatus that can receive image information through a computer network as a file attached to an e-mail message and transmit said image information to another facsimile apparatus through a public channel in compliance with the facsimile transmission procedure includes a LAN interface unit that exchanges computer data through said computer network, a facsimile interface unit that exchanges facsimile data through said public channel, a memory unit, a control unit that stores, in said memory unit, an e-mail address to which a backup transmission e-mail message is to be transmitted, creates, in response to the transmission of said image information to the other facsimile apparatus through said public channel, communication control information with respect to the transmission of said image information, prepares said backup transmission e-mail containing said communication control information therein, and transmits said backup transmission e-mail to said e-mail address through said computer network.

In another aspect of this disclosure, when a network facsimile apparatus transmits image information received as e-mail through a network to other facsimile apparatuses through a public channel, it stores an e-mail address of a backup transmission destination with respect to the facsimile transmission in a memory unit for registering e-mail addresses beforehand. When the facsimile transmission is completed, the control unit generates communication control information. The control unit prepares an e-mail message that includes the communication control information, and transmits the prepared e-mail to the e-mail address stored in the memory unit using the LAN interface unit. A user can easily and readily ensure the result of the facsimile transmission by the e-mail from the network facsimile apparatus. The network facsimile apparatus becomes useful.

Other features, and advantages of the present invention will become more apparent from the following detailed description when read in conjunction with the accompanying drawings.

BRIEF DESCRIPTION OF THE DRAWINGS

FIG. 4 illustrates an example of an e-mail message created in the backup transmission process showed in FIG. 3, wherein destination information is indicated in the "Subject:" field of the header;

FIG. 6 illustrates an example of an e-mail message created in the backup transmission process showed in FIG. 5;

FIG. 8 illustrates an example of an e-mail message created in the backup transmission process showed in FIG. 7;

FIG. 10 illustrates an example of an e-mail message created in the backup transmission process showed in FIG. 9;

FIG. 14 illustrates an example of an e-mail message created in the backup transmission process showed in FIG. 13;

DETAILED DESCRIPTION OF PREFERRED EMBODIMENTS

Examples and exemplary embodiments of the present invention will be described in detail below by reference to the drawings. Although various technical limitations may be applied to the following examples and exemplary embodiments for preferable implementation, those skilled in the art should understand that the principle of the present invention does not require such limitations unless otherwise specified.

Figure 1:
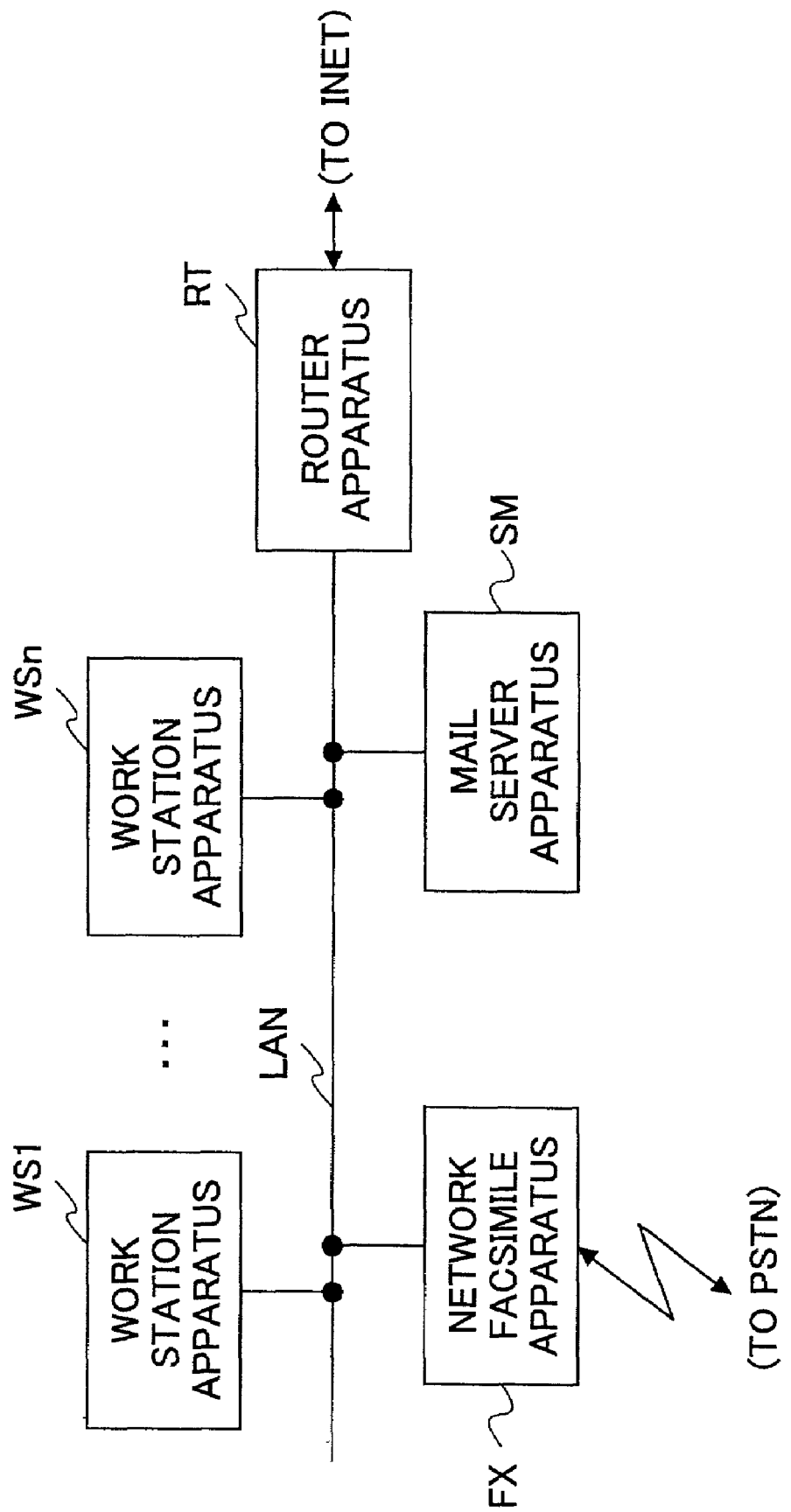
FIG. 1 is a schematic drawing showing the system configuration of a computer network in which the network facsimile apparatus according to an embodiment of the present invention is included.

FIGS. 1-16 show examples and exemplary embodiments of the facsimile apparatus of the present invention. FIG. 1 is a schematic diagram showing the system configuration of network system 1 in which the network facsimile apparatus FX according to a preferred embodiment of the present invention is included.

In FIG. 1, the network system 1 includes a plurality of work station apparatuses WS1-WSn, a mail server apparatus SM, and a network facsimile apparatus FX connected to a Local Area Network LAN. Local Area Network LAN is connected to the Internet by a router apparatus RT and exchanges various kinds of data with host apparatuses connected to other networks.

The mail server apparatus SM collects e-mail from and delivers e-mail to the work station apparatuses WS1-WSn connected to the Local Area Network LAN and network facsimile apparatus FX.

The workstation apparatuses WS1-WSn include various kinds of programs of application software for exchanging various kinds of data (such as e-mail) and application software for processing image information included in the e-mail that the workstation apparatuses receive from the network facsimile apparatus FX (viewer). Each of the workstation apparatuses WS1-WSn is used by one or more users.

Additionally, the network facsimile apparatus FX is provided with a transceiver function for e-mail through a Local Area Network LAN (a network function), and a transmission function to transmit image information by a facsimile transmission procedure of group 3 (G3) through the public network (PSTN) as the transmission channel (a facsimile function).

The Local Area Network LAN helps the terminals connected to the Local Area Network LAN to exchange data with each other using a combination of communication protocols of the transmission protocol TCP/IP that covers the transport layer and the communication protocols for higher ranking layers. For example, a communication protocol for a higher ranking layer called SMTP (Simple Mail Transfer Protocol) is used for transmitting e-mail.

In the Local Area Network LAN, e-mail is accumulated in the mail server apparatus SM first, and then, delivered. For example, e-mail from the network facsimile apparatus FX to a user of work station apparatus WS 1 is accumulated in the mail server apparatus SM.

The work station apparatuses WS 1-WSn and the network facsimile apparatus FX periodically inquire of the mail server apparatus SM whether e-mail addressed to its user is stored. When e-mail addressed to the user is accumulated in the mail server apparatus SM, the work station apparatuses WS1-WSn and the network facsimile apparatus FX receive the e-mail accumulated by the mail server apparatus SM and notify their users of the receipt. For example, when the work station apparatus WS 1 inquires of the mail server apparatus SM about e-mail reception addressed to its user and whether the mail server apparatus SM stores therein e-mail addressed the user, the mail server apparatus SM informs the work station apparatus WS1 of the receipt of the e-mail, and the work station apparatus WS1 notifies the user of the receipt of the e-mail. When the user receives the notice, the user can read the e-mail to ensure its contents. POP (Post Office Protocol) is an example of commonly used communication protocols.

Additionally, through the Local Area Network LAN, the work station apparatuses WS1-WSn can request the network facsimile apparatus FX to transmit image information to another facsimile apparatus connected to the public network by relaying the image information. E-mail is commonly used for the transmission of this image information in connection with this request for relaying. Additionally, because the Local Area Network LAN is connected to the Internet, a user using another work station apparatus connected to the Internet can request the network facsimile apparatus FX to relay the transmission of image information. This e-mail is a MIME (Multi Purpose Mail Extension) format, and, as image information, image information encoded by the Base 64 coding form is attached to the e-mail message.

And the network facsimile apparatus FX has a function of transmitting image information that is contained in an e-mail attachment received through the local area network LAN to another facsimile apparatus of the public network, as well as a function of exchanging data through the Local Area Network LAN and a function of exchanging facsimile data by the facsimile transmission procedure through a public line. The network facsimile apparatus FX is structured as shown in FIG. 2.

Figure 2:
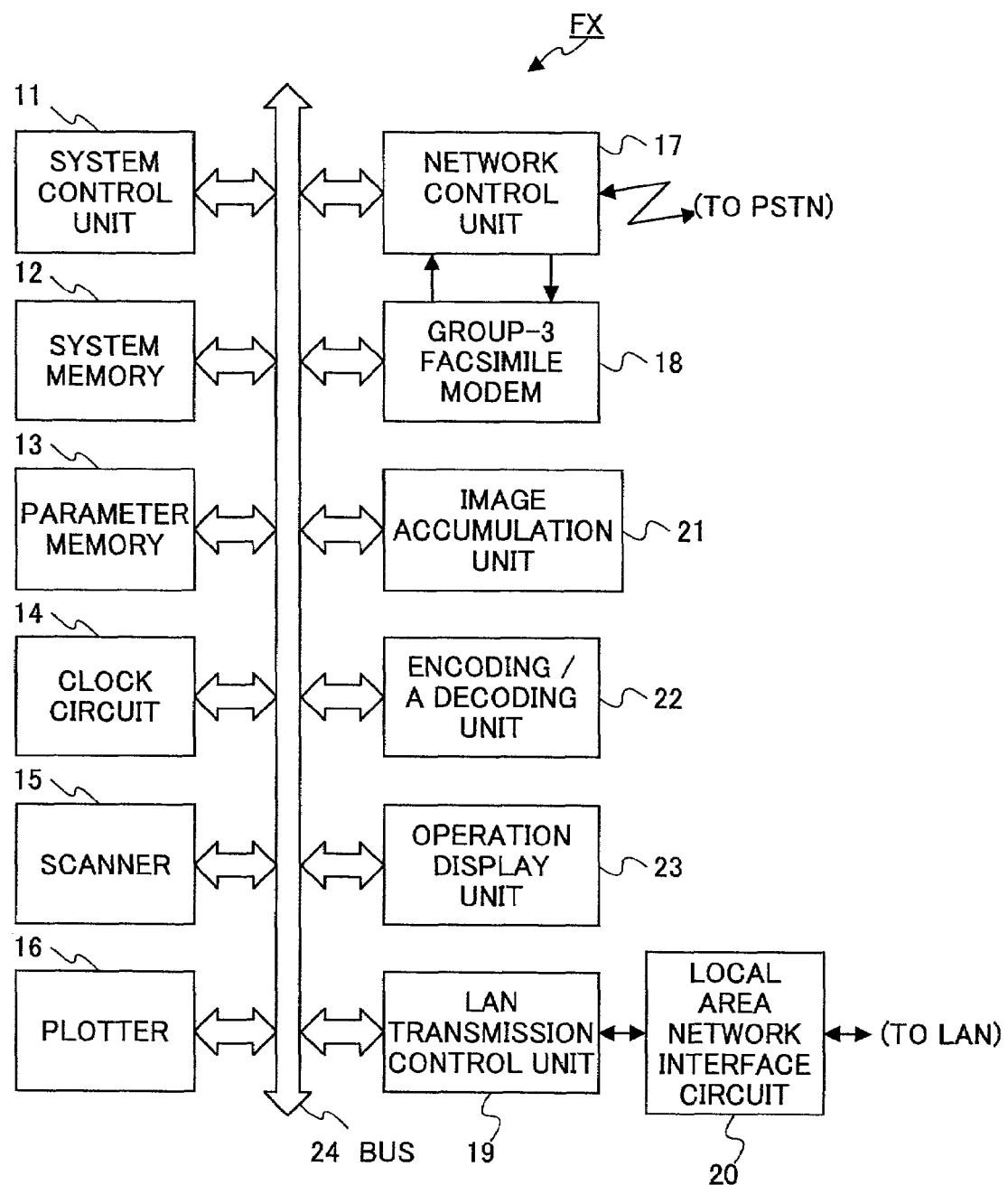
FIG. 2 is a block diagram showing the network facsimile apparatus showed in FIG. 1.

In FIG. 2, the network facsimile apparatus FX comprises a system control unit 11, a system memory 12, a parameter memory 13, a clock circuit 14, a scanner 15, a plotter 16, a network control unit 17, a group-3 facsimile modem 18, a LAN transmission control unit 19, a Local Area Network interface circuit 20, an image accumulation unit 21, an encoding/decoding unit 22, and an operation display unit 23, each main unit being connected to a bus 24. The system memory 12 contains a system program of the network facsimile apparatus FX and various data that are necessary to run the system program. At the same time, the system memory 12 is used as working memory by system control unit 11.

The system control unit (e-mail creating means, analyzing means) 11, based on a system program contained in system memory 12, uses the system memory 12 as working memory, controls each unit of the network facsimile apparatus FX, and performs basic processing of the network facsimile apparatus FX such as various control processing of the facsimile transmission control procedures to be described below, and the system control unit 11 further performs the backup transmission processing that will be described in detail later.

The parameter memory (e-mail address storage means, and administrative information memory means) 13 consists of erasable nonvolatile memory. The parameter memory is backed up with batteries so that, when the power supply of network facsimile apparatus FX is interrupted unintentionally or turned off intentionally, information stored in the parameter memory 13 is sustained.

And, the parameter memory 13 stores therein destination phone numbers for facsimile transmission, dial information such as a destination phone number or a destination name corresponding to one-touch dialing and abbreviated dialing, its (the network facsimile, apparatus FX) own phone number and name, scan density information or record density information, and other various function setting information that is set in order to adequately perform various functions of the network facsimile apparatus FX.

The parameter memory 13 further stores e-mail addresses of the work station apparatuses WS1-WSn and the mail server apparatus SM connected to the Local Area Network LAN along with the network facsimile apparatus FX, and various items of communication control information of previous facsimile communications.

The clock circuit 14 includes an oscillator circuit and a divider circuit. The clock circuit 14 provides current time and generates various clock signals that are necessary for operation of the network facsimile apparatus FX. The scanner 15 is, for example, a line image sensor of CCDs and generally provided with ADF. A multi-paged document is set in the ADF and fed to the scanning position of the scanner 15 page-by-page by the ADF. Scanner 15 scans the document that has been fed by the ADF and reads an image of the document at a predetermined resolution.

The plotter 16 is, for example, a thermal recording apparatus including a thermal element, an electrophotography type recording apparatus, or an ink jet type recording apparatus. The plotter 16 also includes the recording paper cassette that can contain one kind or a plurality of kinds of recording paper of predetermined paper sizes. The plotter 16 records and outputs the received image and the image scanned by the scanner 16 on the recording paper provided by the recording paper cassette. The plotter 16 further records and outputs a necessary report to recording paper.

The network control unit 17 is connected to the public network. The network control unit 17 operates under control of the system control unit 11 to receive a call that is incoming from the public network and automatically originates a call to the public network.

The group-3 facsimile modem 18 operates under control of system control unit 11 and realizes modem function of a group 3 facsimile.

The Local Area Network interface circuit 20 connects this network facsimile apparatus FX to the Local Area Network LAN. The Local Area Network transmission control unit 19 performs communication control processing of various predetermined protocol suites to exchange various kinds of data with other data terminals through the Local Area Network LAN.

The image accumulation unit 21, for example, consists of random access memory or a hard disk, and stores received image information or image information to be transmitted encoded by the encoding/decoding unit 22.

The encoding/decoding unit 22 makes the accumulation of the image information to the image accumulation unit 21 efficient and quick. The encoding/decoding unit 22 encodes the image information according to a predetermined encoding system, and decodes the encoded image information.

The operation display unit 23 is provided with operation keys such as ten keys or a start key and various function keys. The operation display unit 23 is further provided with a display as displaying means such as a liquid crystal display. A user can input, from the operation keys of operation display unit 23, various instructions of transmission operation. On the display, the instructions and operations input through the operation keys and various information from the network facsimile apparatus FX are displayed to notify the operator.

System control unit 11, system memory 12, parameter memory 13, clock circuit 14, scanner 15, plotter 16, operation display unit 23, encoding/decoding unit 22, image accumulation unit 21, group-3 facsimile modem 18, network control unit 17, and LAN transmission control unit 19 are connected with the internal bus 24 as described above. The network facsimile apparatus FX mainly exchanges data between each unit through the internal bus 24. Additionally, in the network facsimile apparatus FX, the network control unit 17 and the group-3 facsimile modem 18 exchange data directly.

A detailed description is made of the operation of the preferred embodiments. In the network system 1 of these preferred embodiments, the network facsimile apparatus FX performs the e-mail backup transmission.

Figure 3:
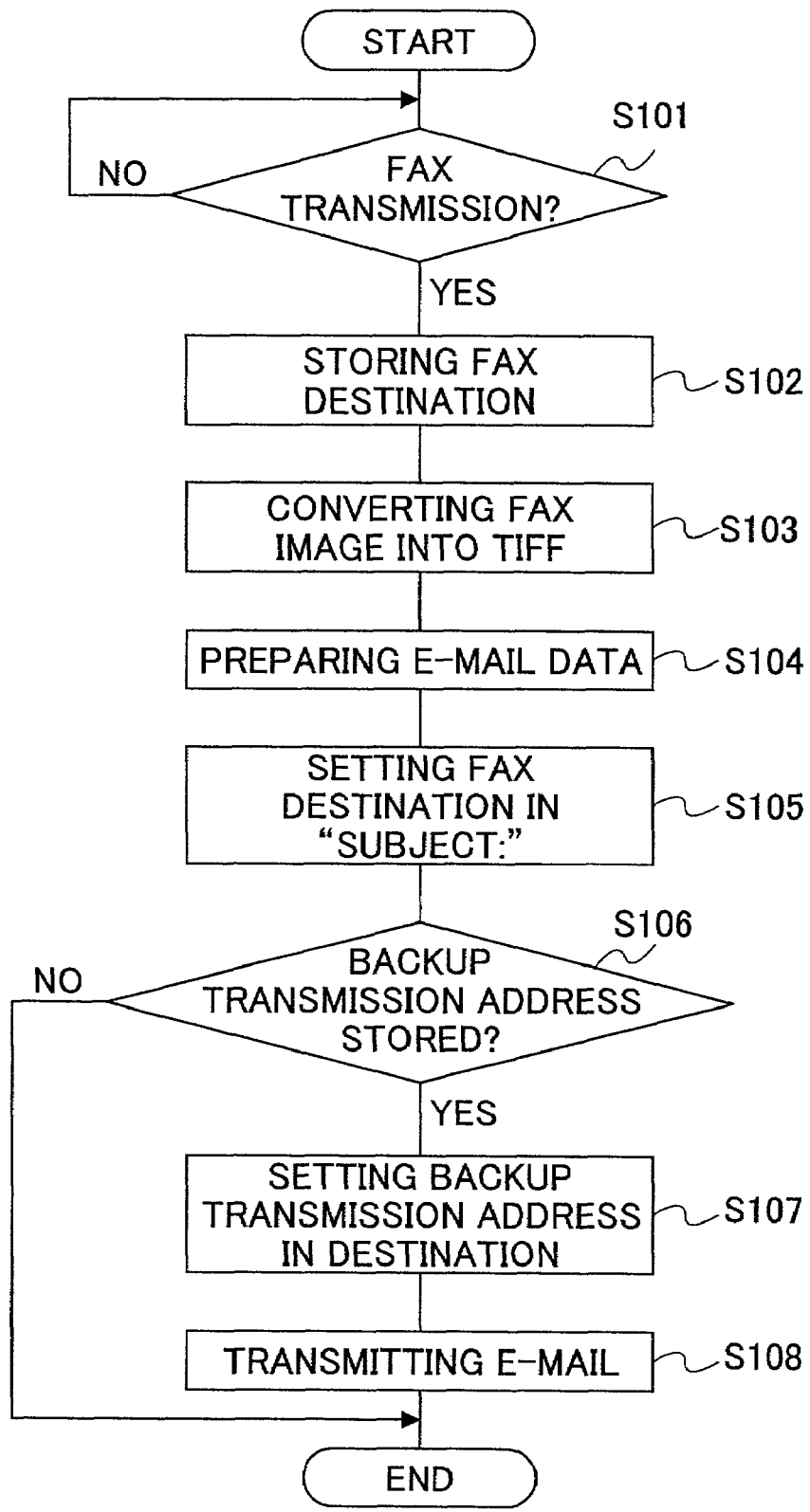
FIG. 3 is a flow diagram showing the backup transmission process of the network facsimile apparatus showed in FIG. 2.

That is, as shown in FIG. 3, the network facsimile apparatus FX checks whether it has performed any facsimile transmission operation (step S101). The network facsimile apparatus FX, after performing the facsimile transmission in response to the facsimile transmission operation when the facsimile transmission operation is requested, stores the destination address (phone number data) in the parameter memory 13 (step S102).

Next, network facsimile apparatus FX converts the image that is transmitted by the group-3 facsimile transmission procedure into the TIFF format (step S103). After the conversion, the TIFF-formatted transmission image is further converted into the MIME format and attached to an e-mail message as an attached file (step S104). In the "Subject:" field of the e-mail, the e-mail address of the facsimile destination that is stored in the parameter memory 13 is set (step S105).

An example of this destination address header in which the destination information is included in the "Subject:" field is shown in FIG. 4. Besides the phone number data, date and time information, communication mode information indicating whether G3 or e-mail, and a file number are also added. In addition, when a fax transmission is made to a destination that is specified by one-touch dialing and abbreviated dialing, or group dialing, the number and name may be added to the "Subject:" field.

Next, network facsimile apparatus FX checks whether an e-mail address of a backup destination is stored in parameter memory 13 beforehand (step S106). When an e-mail address of a backup destination is stored, the network facsimile apparatus FX sets the e-mail address of the backup destination as the destination of the e-mail created above (step S107).

Network facsimile apparatus FX transmits the e-mail data created as described above after setting the e-mail address in the "Subject:" field and finishes processing (step S108).

Additionally, when, in step S106, an e-mail address of a backup destination is not stored in parameter memory 13, the network facsimile apparatus FX just finishes processing without transmitting the e-mail.

As thus described, network facsimile apparatus FX according to this preferred embodiment, when transmitting the image information that is contained in the e-mail received through the Local Area Network LAN to another facsimile apparatus through the public network, stores an e-mail address of a backup destination in connection with the facsimile transmission in parameter memory 13 beforehand. When the facsimile transmission is completed, the network facsimile apparatus FX generates various communication information about the facsimile transmission as communication management information, prepares an e-mail that contains the communication management information, and transmits the prepared e-mail to the e-mail address stored in the parameter memory 13.

Therefore, the work station apparatuses WS1-WSn can easily check the result of the facsimile transmission by e-mail from the network facsimile apparatus FX. The network facsimile apparatus FX becomes useful.

Additionally, network facsimile apparatus FX of this embodiment creates an e-mail message by including the transmission image data that is converted from the image information transmitted by the facsimile function into the TIFF-formed image data, which is a predetermined compression format.

Therefore, the TIFF-formed image data clearly indicates which document the backup transmission e-mail is for. The network facsimile apparatus FX becomes more useful.

Furthermore, network facsimile apparatus FX according to this embodiment prepares the e-mail that describes a phone number or an e-mail address of the destination of the facsimile transmission in the "Subject:" field of the e-mail.

Therefore, for the work station apparatuses WS1-WSn that requested the facsimile transmission, the network facsimile apparatus FX can classify and arrange the backup transmission e-mail in connection with each facsimile transmission easily and still more surely. The network facsimile apparatus FX becomes more useful.

Figure 5:
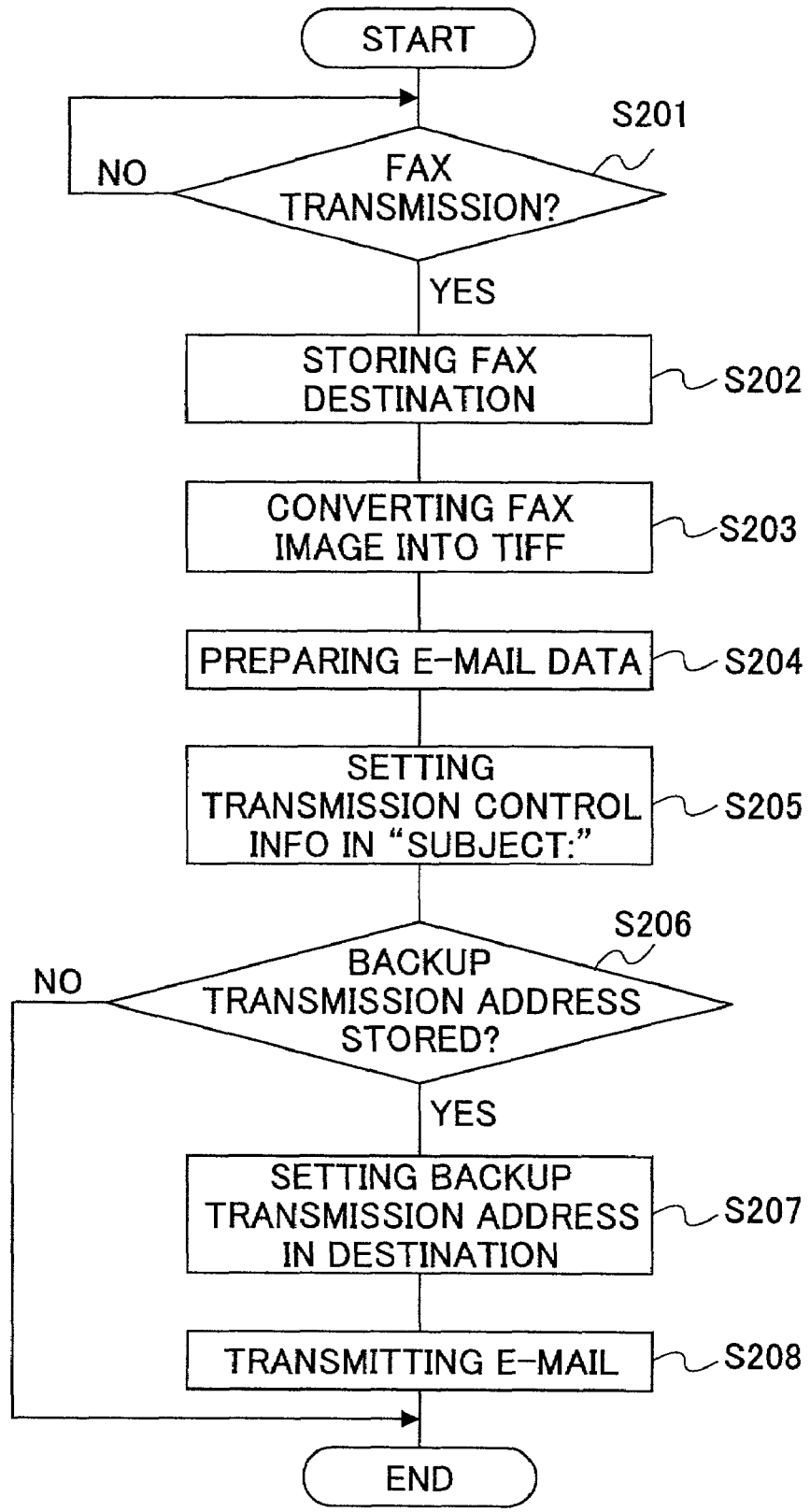
FIG. 5 is a flow diagram showing the backup transmission process of the network facsimile apparatus showed in FIG. 2, in which an e-mail message containing communication control information is indicated in the "Subject:" field of the header.

Additionally, network facsimile apparatus FX can, as showed in FIG. 5, perform the backup transmission with communication control information in the "Subject:" field of the e-mail message.

That is, network facsimile apparatus FX checks whether facsimile transmission operation is requested (step S201). After having transmitted a facsimile in response to the facsimile transmission operation if a facsimile transmission operation is requested, the network facsimile apparatus FX stores the destination address (phone number data) in the parameter memory 13 (step S202).

Next, network facsimile apparatus FX converts the facsimile data transmitted in a group-3 facsimile transmission procedure into a TIFF format. After MIME-converting the TIFF-formatted transmission image, the network facsimile apparatus FX attaches the image to an e-mail message as an attached file (step 204). In the "Subject:" field of the e-mail, the network facsimile apparatus FX sets contents of a communication control report of the facsimile communication as communication control information (step S205).

An example of the address header of the e-mail that contains control information in the "Subject:" field is showed in FIG. 6. The example includes the date and time, a destination name, a communication mode, a communication condition, communication time period, the number of pages, the result of the transmission, a user name and a document number in an order.

Next, the network facsimile apparatus FX checks whether a backup destination is stored in the parameter memory 13 beforehand (step S206). When an e-mail address of a backup destination is stored, the network facsimile apparatus FX sets the e-mail address as the destination of the backup e-mail prepared (step S207).

Network facsimile apparatus FX, after setting the e-mail address, transmits the e-mail data prepared as described above and finishes processing (step S208).

Additionally, in stepping S206, if no e-mail address of the backup destination is stored in the parameter memory 13, the network facsimile apparatus just finishes processing without transmitting the e-mail.

As described above, if the network facsimile apparatus FX prepares communication control information for every facsimile communication and further prepares an e-mail message indicating the communication control information in the "Subject:" field of the e-mail, the operator can manage the results of the facsimile transmission in more detail. The network facsimile apparatus FX becomes more useful.

Figure 7:
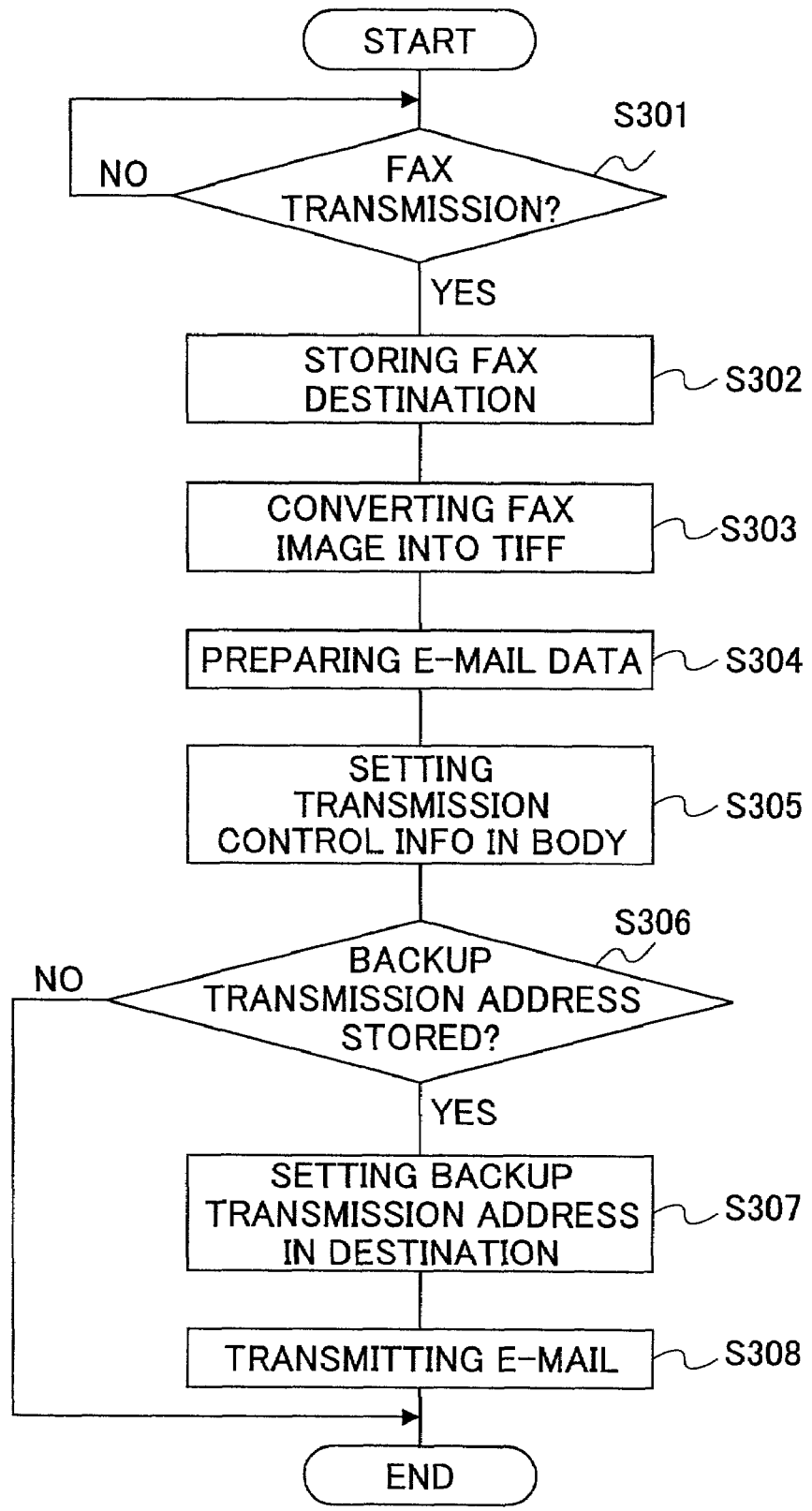
FIG. 7 is a flow diagram showing the backup transmission process of the network facsimile apparatus showed in FIG. 2, in which an e-mail message-containing communication control information is indicated in the body of the e-mail.

Furthermore, the network facsimile apparatus FX, in the backup-transmission as shown in FIG. 7, can include the communication control information in the body of the e-mail and transmit the e-mail as a backup.

That is, the network facsimile apparatus FX checks whether there is a facsimile transmission operation (step S301). When there is a facsimile transmission operation, after performing the facsimile transmission in response to the facsimile transmission operation, the network facsimile apparatus stores the address (phone number data) of the facsimile destination in the parameter memory 13 (step S302).

Next, the network facsimile apparatus FX converts the data transmitted in a group-3 facsimile transmission procedure into a TIFF format (step S303). After converting the transmission image converted into a TIFF format by MIME transformation, the network facsimile apparatus FX sets the converted transmission image in an e-mail message as an attached file (step S304). The network facsimile apparatus FX sets the e-mail address of the destination stored in the parameter memory 13 in the "Subject:" field of the e-mail.

And the network facsimile apparatus FX sets the contents of the communication control report of the facsimile transmission in the body of the e-mail as communication control information (step S305).

An example of the e-mail message with communication control information in its body is shown in FIG. 8. The date and time, a destination name, a communication mode, a communication condition, communication time, the number of pages, the result of the transmission, a user name and a document number are indicated in that order. The contents of the transmission image are attached as a TIFF file. In addition, FIG. 8 shows the case in which a plurality of transmissions have been performed. If only one transmission has been performed, the communication history is listed in only one line.

Next, the network facsimile apparatus FX checks whether a backup destination is stored in the parameter memory 13 beforehand (step S306). When an e-mail address of the backup destination is stored, the address is set as an e-mail address of the backup transmission as the destination of the e-mail prepared (step S307).

Network facsimile apparatus FX, after setting an e-mail address, transmits the e-mail data prepared as described above to the e-mail address, and finishes processing (step S308).

Additionally, in step S306, if an e-mail address for a backup transmission is not stored in the parameter memory 13, the network facsimile apparatus FX just finishes processing without transmitting the e-mail.

As described above, the network facsimile apparatus prepares communication control data for every transmission, and also prepares an e-mail that indicates the prepared communication control data in the body of the e-mail as communication control information. The network facsimile apparatus can transmit the communication control information in more detail using e-mail. Accordingly, the network facsimile apparatus FX becomes more useful.

Figure 9:
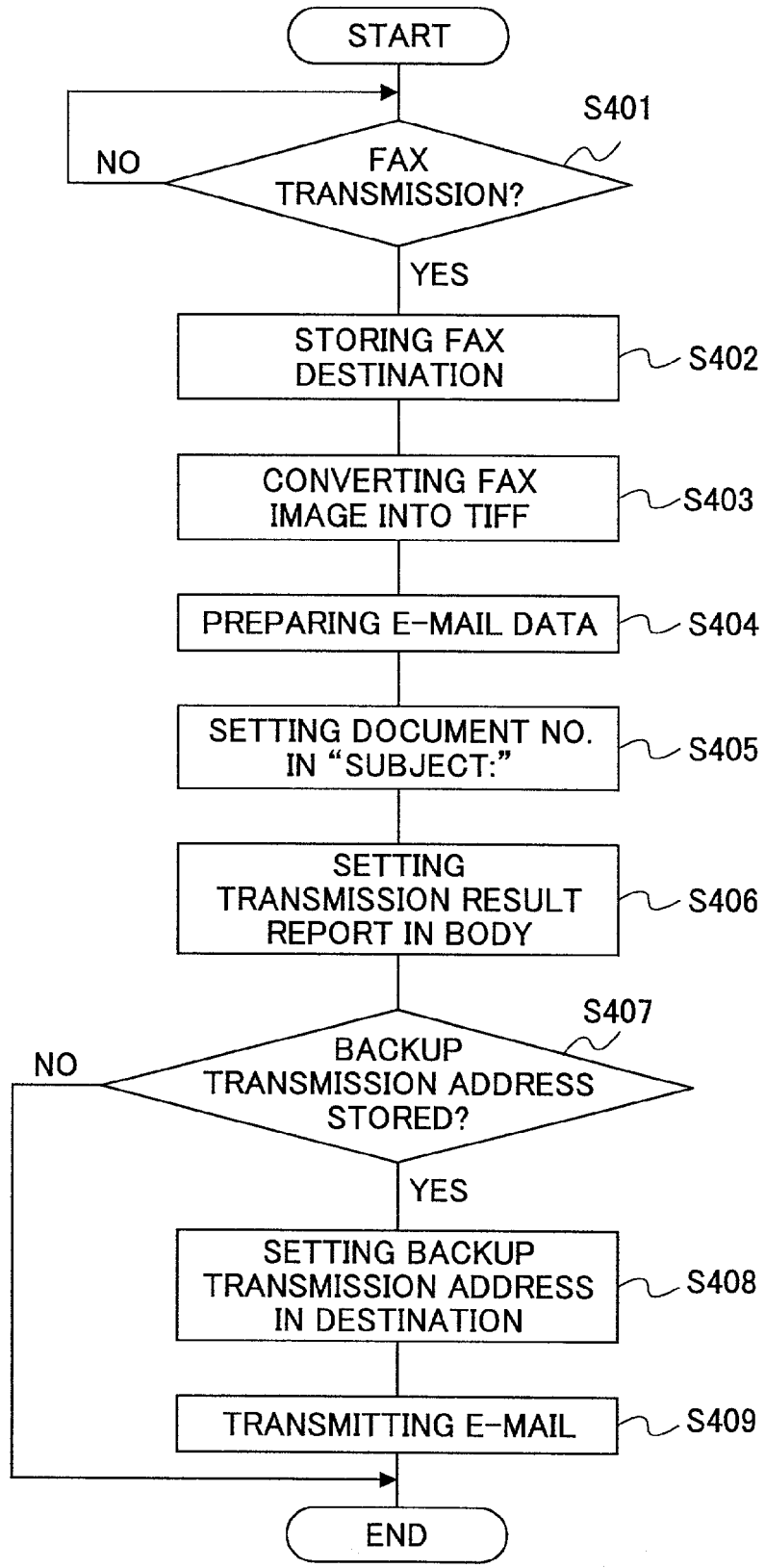
FIG. 9 is a flow diagram showing the backup transmission process of the network facsimile apparatus showed in FIG. 2, in which transmission result and control information are indicated in the body of an e-mail message.

Additionally, the network facsimile apparatus FX, as shown in FIG. 9, can place the transmission result communication control information in the body of an e-mail message and transmit the e-mail as a backup transmission.

That is, the network facsimile apparatus FX checks whether there is a facsimile transmission operation (step S401). When there is facsimile transmission operation, after performing the facsimile transmission in response to the facsimile transmission operation the network facsimile apparatus FX stores the address (phone number data) in the parameter memory 13 (step S402).

Next the network facsimile apparatus FX performs image transformation from the data transmitted in a group-3 facsimile transmission procedure to TIFF format (step S403). After converting the TIFF-formatted transmission image into a MIME format, the network facsimile apparatus FX prepares e-mail data by setting the MIME-formatted transmission image as an attached file of the e-mail message (step S404).

Additionally, the network facsimile apparatus sets a document number in the "Subject:" field of the e-mail message (step S405), but can use an address of the facsimile destination stored in the parameter memory 13.

And the network facsimile apparatus FX sets the contents of the transmission result report of the facsimile transmission in the body of the e-mail message as communication control information (step S406).

The e-mail header including communication control information (a transmission result report) in the body of the e-mail is showed in FIG. 10, for example. The reception time, a document number, a communication condition, a destination (a group), a result and a page number are indicated in the body of the e-mail. If the attached file includes a plurality of pages, only the first page is attached to the e-mail.

Next, the network facsimile apparatus FX checks whether a backup destination is stored in the parameter memory 13 beforehand (step S407). When an e-mail address of a backup destination is stored, the network facsimile apparatus FX sets the e-mail address as the destination of the e-mail prepared as described above (step S408).

Network facsimile apparatus FX, after setting the e-mail address, transmits the e-mail data prepared as described above to the e-mail address and finishes processing (step S409).

Additionally, in step S407, when an e-mail address of a backup transmission is not stored in the parameter memory 13, the network facsimile apparatus FX just finishes processing without transmitting the e-mail.

As described above, a communication result report is prepared for every transmission, and the prepared communication result report is included in the body or the "Subject:" field of an e-mail message to inform the operator of communication control information. Usually, the network facsimile apparatus FX transmits the communication result report that the network facsimile apparatus FX prepares for every facsimile transmission as communication control information. Since the e-mail of the backup transmission is prepared easily and at low cost, the network facsimile apparatus FX becomes more useful and cost effective.

Figure 11:
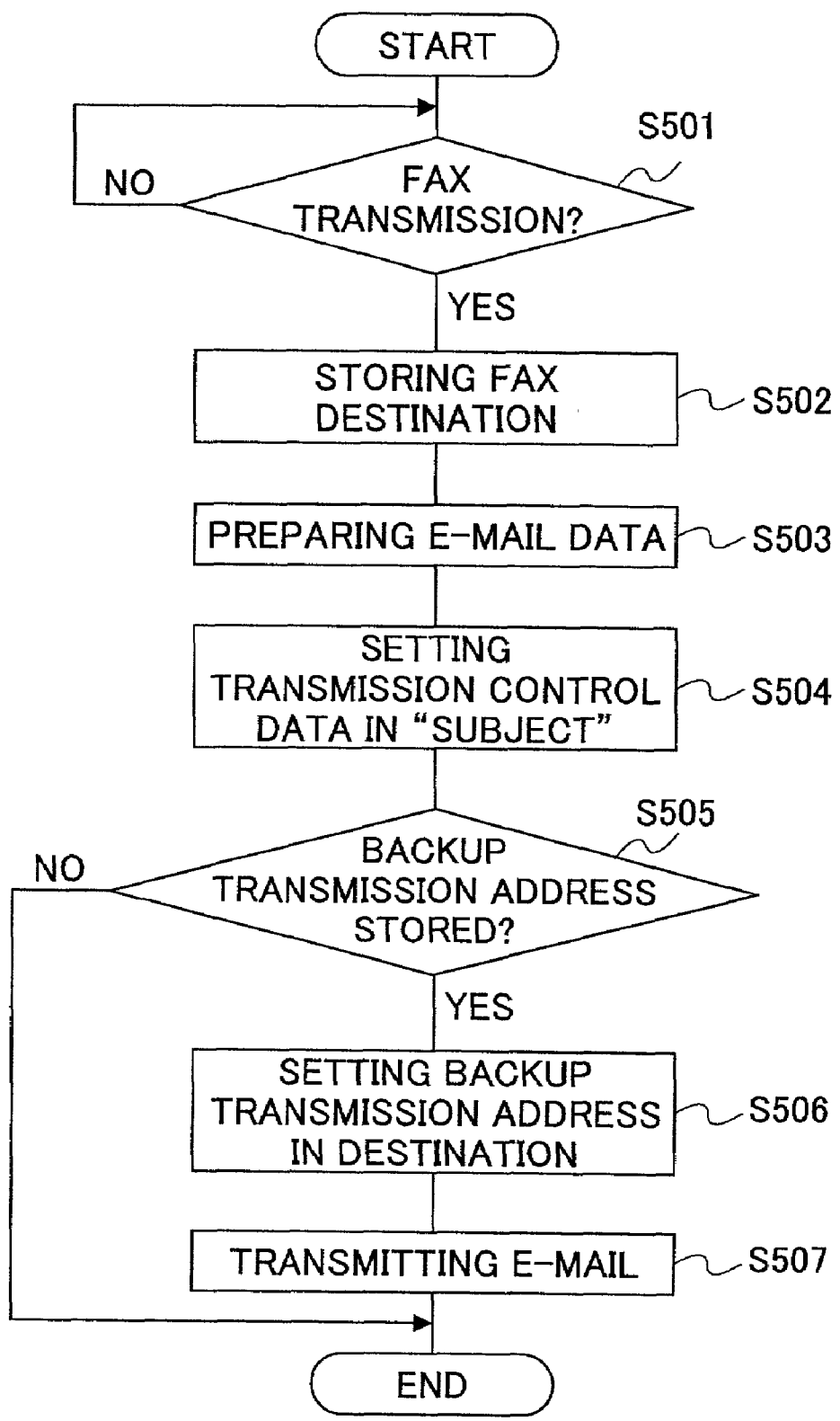
FIG. 11 is a flow diagram showing the backup transmission process of the network facsimile apparatus showed in FIG. 1, in which an e-mail message containing communication control information is indicated in the "Subject:" field of the e-mail.

Furthermore, the network facsimile apparatus FX, in the backup transmission as shown in FIG. 11, can include communication control information in the "Subject:" field of backup transmission e-mail.

That is, the network facsimile apparatus FX checks whether there is a facsimile transmission operation (step S501). When there is a facsimile transmission operation, after transmitting in response to the facsimile transmission operation, the network facsimile apparatus FX stores an address (phone number data) of the facsimile destination in the parameter memory 13 (step S502).

Next, the network facsimile apparatus FX prepares e-mail data (step S503). In this case, a transmission image is not included in the e-mail message as an attached file. And the network facsimile apparatus FX sets communication control data of the facsimile communication (communication control information) in the "Subject:" field of the e-mail (step S504).

An address header of the e-mail which includes communication control information in the "Subject:" field is showed in FIG. 6, for example. A date and time, a destination name, a communication mode, a communication condition, communication time, the number of pages, a result of transmission, a user name and a document number are indicated.

Next, the network facsimile apparatus FX checks whether an address of the backup transmission is stored in the parameter memory 13 beforehand (step S505). When an e-mail address of the backup transmission destination is stored, the network facsimile apparatus FX sets the address of the backup transmission destination as the destination of the e-mail prepared as described above (step S506).

Network facsimile apparatus FX, after setting the e-mail address, transmits the e-mail data prepared as described above to the e-mail address and finishes processing (step S507).

Additionally, in step S505, when an e-mail address of a backup transmission destination is not registered in the parameter memory 13, the network facsimile apparatus finishes processing without transmitting the e-mail.

As described above, the network facsimile apparatus prepares an e-mail message which indicates communication control data of the facsimile transmission (communication control information) in the "Subject:" field of the e-mail. The network terminal which requested the network facsimile apparatus FX for the facsimile transmission can easily control the communication control information by identifying to which facsimile transmission the backup transmission e-mail corresponds easily and surely. The network facsimile apparatus FX becomes more useful.

Additionally, only the communication control information is indicated in the body of the backup transmission e-mail in this case. The data size of the backup transmission e-mail becomes small so that the e-mail can be transmitted in a short time period. The network terminal that has requested the facsimile transmission can manage the communication control information by receiving a small-sized e-mail message. Accordingly, the network facsimile apparatus FX becomes more useful.

Figure 12:
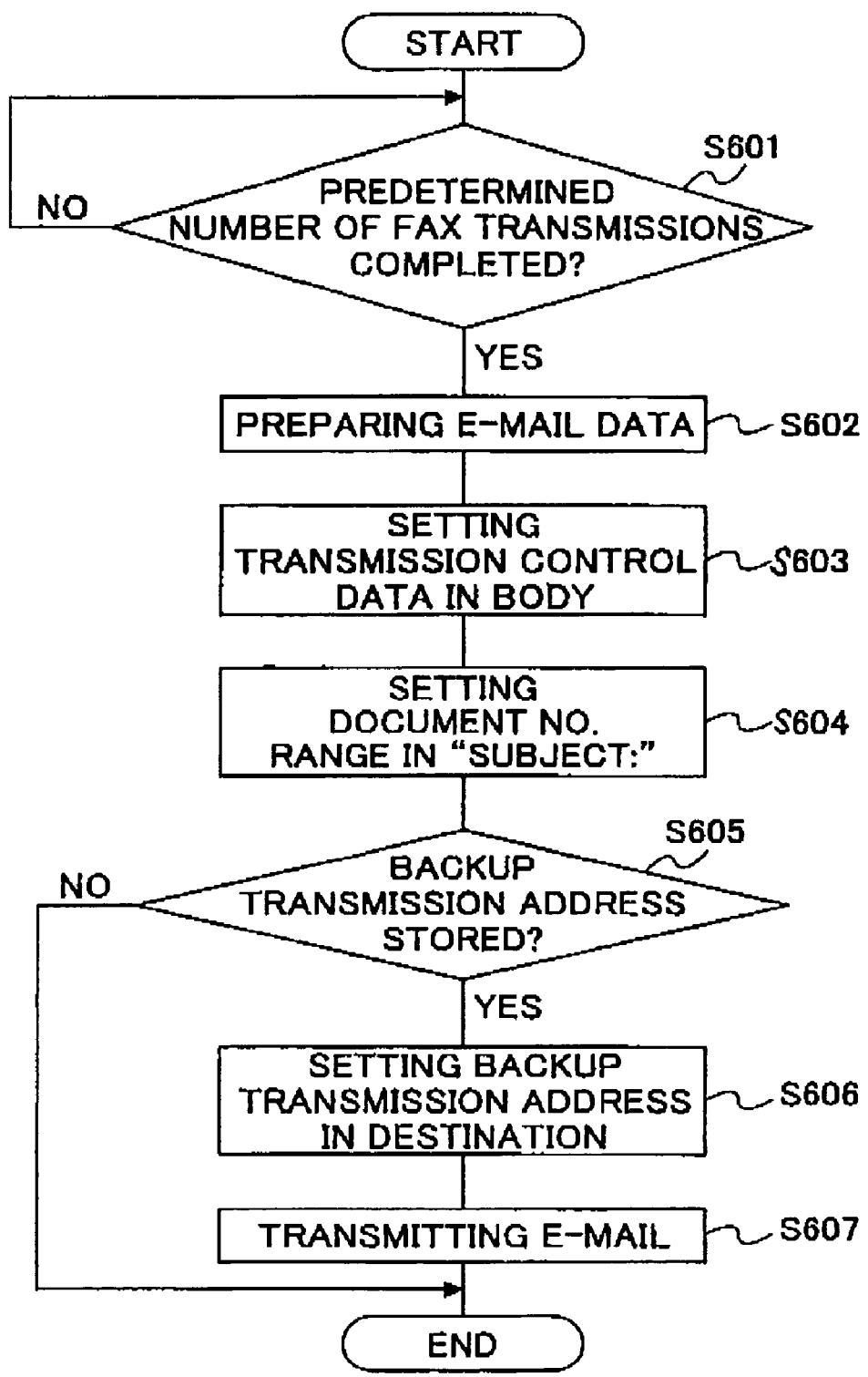
FIG. 12 is a flow diagram showing the backup transmission process of the network facsimile apparatus showed in FIG. 1, in which an e-mail message containing communication control information is indicated in the "Subject:" field of the e-mail.

Additionally, the network facsimile apparatus FX, when transmitting the backup transmission e-mail as shown in FIG. 12, can include communication control information of a plurality of transmission in the body of the backup transmission e-mail.

That is, the network facsimile apparatus FX, when there is a facsimile transmission operation, after performing one facsimile transmission, stores the address of the facsimile destination (phone number data) in the parameter memory 13. In this case, a transmission image is not attached to the e-mail message in this embodiment, but it may be attached, if preferable.

And the network facsimile apparatus FX checks whether the number of facsimile transmission has exceeded a predetermined number set beforehand (step S601). When the number of the facsimile transmission exceeds the predetermined number, the network facsimile apparatus prepares e-mail data (step S602).

And network facsimile apparatus FX collects communication control data of a plurality of facsimile transmission and sets the collected data in the body of an e-mail message (step S603). In the "Subject:" field of the backup transmission e-mail message, the network facsimile apparatus FX sets the range of file numbers corresponding to the collected data (step S604).

Next, the network facsimile apparatus FX checks whether a backup transmission destination is stored in the parameter memory 13 beforehand (step S605). When an e-mail address of a backup transmission destination is stored, the network facsimile apparatus FX sets the address of the backup transmission e-mail message prepared as described above as an e-mail address of the backup transmission destination (step S606).

Network facsimile apparatus FX, after setting the e-mail address, transmits the above e-mail data to the e-mail address and finishes processing (step S607).

Additionally, in step S605, when an e-mail address of a backup transmission destination is not stored in the parameter memory 13, the network facsimile apparatus FX finishes processing without transmitting the e-mail.

As described above, the network facsimile apparatus FX stores communication control information of the facsimile transmission in the parameter memory 13 for every facsimile transmission. When communication control information corresponding to the facsimile transmissions of the predetermined number is stored in the parameter memory 13, the network facsimile apparatus FX prepares the e-mail including communication control information for the plurality of facsimile transmissions and transmits the e-mail. The network facsimile apparatus can reduce the number of e-mail transmissions and accordingly reduce traffic on the local area network LAN. In this manner, the network facsimile apparatus FX and the local area network LAN to which the network facsimile apparatus FX is connected become more useful.

Figure 13:
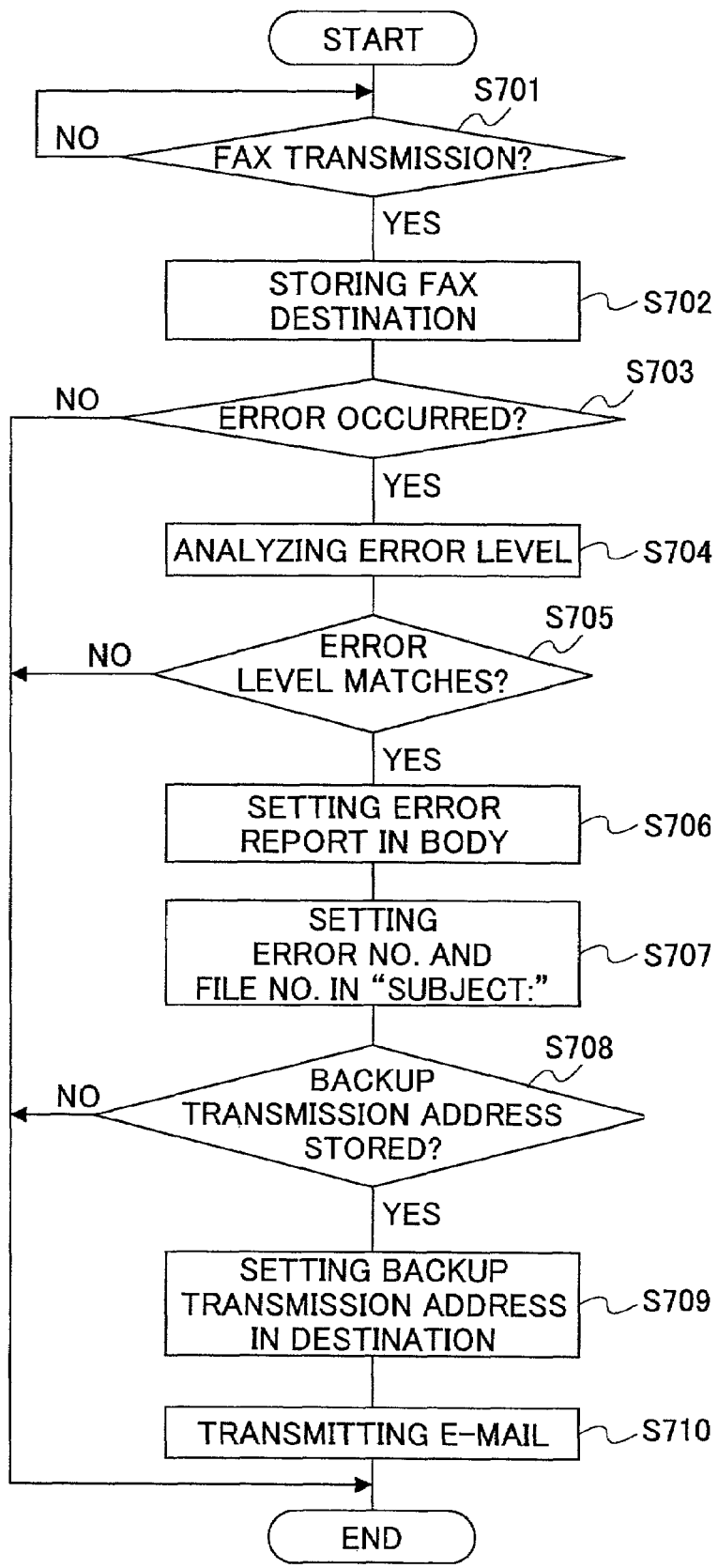
FIG. 13 is a flow diagram showing the backup transmission process of the network facsimile apparatus showed in FIG. 1, in which an e-mail message containing error information is transmitted.

Furthermore, network facsimile apparatus FX, in the backup transmission shown in FIG. 13, can transmit error information by e-mail. Additionally, in the processing showed in FIG. 13, the transmission image is not attached to the error information. The transmission image, however, may be attached to the error information in the same manner as the backup transmission showed in FIG. 3. An e-mail address of a backup transmission destination of error information is stored in the parameter memory 13 of network facsimile apparatus FX beforehand.

That is, the network facsimile apparatus FX checks whether there is a facsimile transmission operation (step S701). When there is a facsimile transmission operation, after performing the facsimile transmission in response to the facsimile transmission operation, the network facsimile apparatus FX stores the address of the facsimile transmission destination (phone number data) in the parameter memory 13 (step S702).

Next, the network facsimile apparatus FX checks whether an error has occurred (step S703). When an error has not occurred, the network facsimile apparatus FX performs one of the backup transmission processes described above.

When the network facsimile apparatus FX detects an occurrence of an error, the network facsimile apparatus FX analyzes the error level of the error (step S704). The network facsimile apparatus FX checks whether the level of the error is higher than a predetermined level, for example, a channel error instead of line busy error of which the error level is low (step S705).

If no error level matches in step S705, the network facsimile apparatus FX-finishes processing without performing anything. On the other hand, if an error level matches in step S705, the network facsimile apparatus sets an error report in the body of an e-mail message (step S706). The network facsimile apparatus FX further sets an error code and a file number in the "Subject:" field of the e-mail message (step S707).

An address header of the e-mail message to which an error report is added to the body is showed in FIG. 14, for example.

Next, the network facsimile apparatus FX checks whether a backup transmission destination of error information is stored in the parameter memory 13 beforehand (step S708). When an e-mail address of a backup transmission destination of error information is stored, the network facsimile apparatus FX sets the e-mail address of the backup transmission destination of the error information to the destination address of the above prepared e-mail message (step S709).

Network facsimile apparatus FX, after setting the e-mail address, transmits the e-mail data prepared as described above to the e-mail address and finishes processing (step S710).

Additionally, in step S708, when an e-mail address of the backup transmission destination of error information is not stored in the parameter memory 13, the network facsimile apparatus just finishes processing without transmitting the e-mail.

As described above, when a communication error occurs in the facsimile transmission, network facsimile apparatus FX analyzes the error level of the communication error that occurred. If the error level matches a predetermined error level, the network facsimile apparatus FX describes an error report of the facsimile transmission in the body and prepares an e-mail message that indicates a file number and a category of the error of the facsimile transmission that occurred in the "Subject:" field. The network facsimile apparatus FX transmits the prepared e-mail message to the e-mail address registered in the parameter memory 13 as a backup transmission destination of error information. The network facsimile apparatus FX can avoid notifying of a frequent error such as "line busy", which is less important. Since the network facsimile apparatus FX can notify the operator of more important error information for sure, the operator can manage important information adequately and easily, and the network facsimile apparatus FX becomes much more useful.

Figure 15:
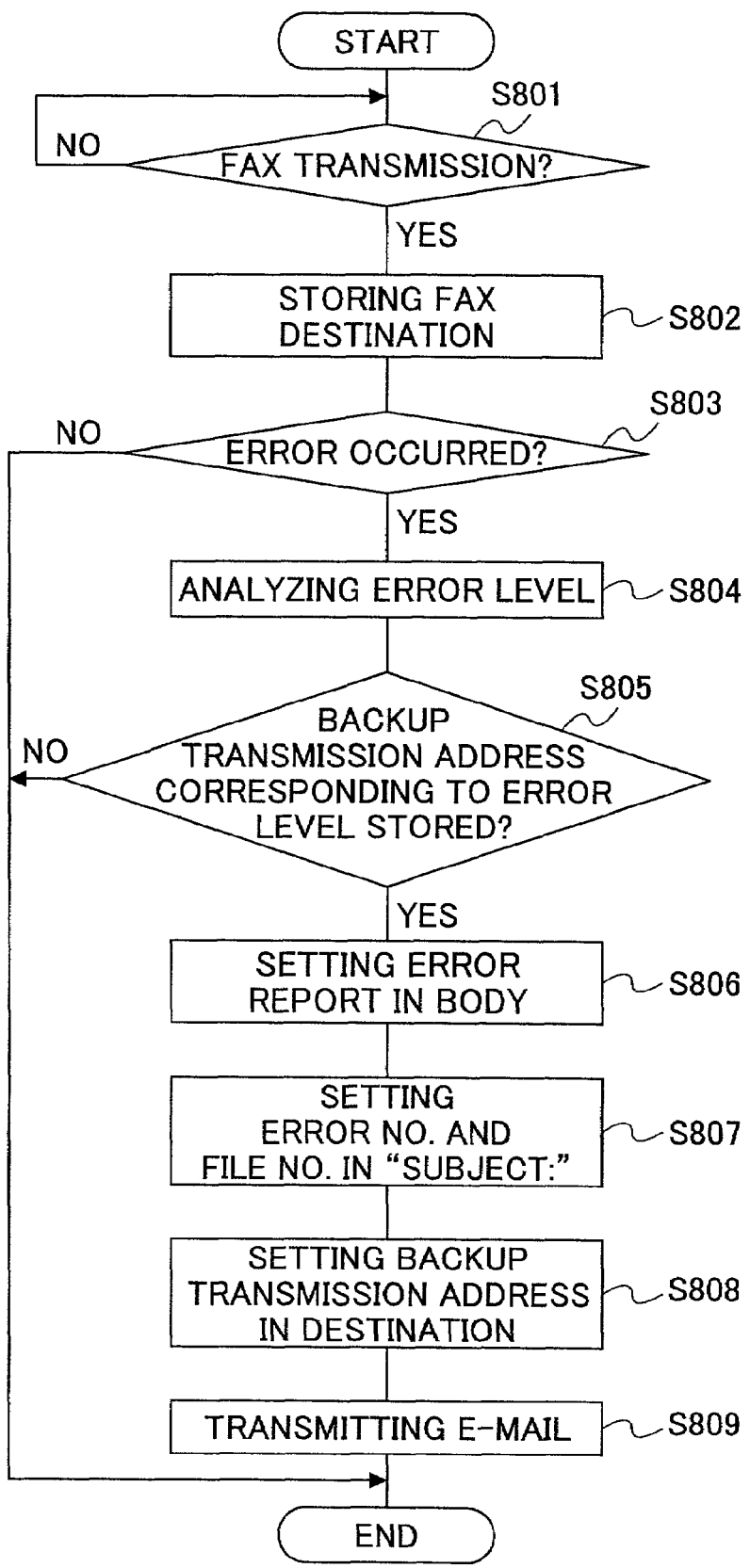
FIG. 15 is a flow diagram showing the backup transmission process of the network facsimile apparatus showed in FIG. 1, in which the network facsimile apparatus switches processing sequence in response to an error level.

Additionally, the network facsimile apparatus FX, in the backup transmission, as shown in FIG. 15, can change a sequence of processing depending on error level. Additionally, in the processing showed in FIG. 15, when transmitting the error information, the network facsimile apparatus FX does not attach the transmitted information to the e-mail message. The network facsimile apparatus FX, however, can attach the transmitted information to the e-mail in the manner as the backup transmission showed in FIG. 3, for example. An e-mail address of a backup transmission destination corresponding to each error level is stored beforehand in the parameter memory 13 of the network facsimile apparatus FX.

That is, the network facsimile apparatus FX checks whether there is a facsimile transmission operation (step S801). When there is a facsimile transmission operation, after transmitting in response to the facsimile transmission operation, the network facsimile apparatus FX stores an address of the facsimile destination (phone number data) in the parameter memory 13 (step S802).

Next, the network facsimile apparatus FX checks whether an error has occurred (step S803). When no error has occurred, the network facsimile apparatus FX performs one of the backup transmission processes described above.

When, in step S803, the network facsimile apparatus FX detects occurrence of an error, the network facsimile apparatus FX analyzes the error level of the error (step S804). The network facsimile apparatus FX checks whether a backup transmission destination address of error information corresponding to the error level is stored in the parameter memory 13 (step S805). For example, if the error level is "communication interruption", then the backup transmission e-mail is to be sent to (examples follow) Ms. A; if "busy", then Mr. B; if "no response", then Mr. C; if the counterpart is not a facsimile apparatus, then Ms. D; if "e-mail size error", then Ms. E; if "decoding error", Mr. F. As illustrated above, the network facsimile apparatus FX checks whether error levels and corresponding e-mail addresses to which the backup transmission of the error information is to be transmitted are stored in the parameter memory 13 in advance. And, the network facsimile apparatus FX finishes processing if, in step S803, no backup destination address of error information corresponding to the detected error is stored.

On the other hand, when a backup destination address of error information corresponding to the detected error is stored, the network facsimile apparatus FX sets an error report in the body of the e-mail message (step S806). The network facsimile apparatus FX further sets an error code and a file number in the "Subject:" field of the e-mail message (step S807). An address header of the e-mail message to which an error report is added to the body of the e-mail message is shown in FIG. 14, for example. In addition to the above, in the case of the above processing, a different backup transmission address is assigned to each error level, but the operator may set the same backup transmission destination address of the error information for all errors.

And, the network facsimile apparatus FX, after setting an error report to the e-mail body and an error code and a file number to the "Subject:" field, further sets an e-mail address of a backup transmission destination of the error information stored beforehand (step S808). The network facsimile apparatus FX transmits the prepared e-mail data to the e-mail address of the backup transmission destination and finishes processing (step S809).

As described above, in this embodiment, the network facsimile apparatus FX stores an e-mail address of a backup transmission destination of error information corresponding to each error level of transmission errors of the facsimile transmission, in the parameter memory 13. The prepared e-mail is transmitted to the e-mail address corresponding to the error level that is obtained as the result of the analysis among e-mail addresses stored in the parameter memory 13. Accordingly, the operator can respond to the communication errors adequately and manage error information efficiently. The network facsimile apparatus FX becomes much more useful.

By the way, in the embodiment showed in FIG. 12, whenever the number of facsimile transmissions becomes a predetermined number, the network facsimile apparatus FX transmits communication control information to a transmission backup destination stored beforehand. As a condition of this transmission, it is possible, for example, to apply a condition to output a communication control report set at the network facsimile apparatus FX. That is, in this case, the network facsimile apparatus FX outputs a communication control report locally and, at the same time, transmits an e-mail message containing the communication control report to the transmission backup point.

Figure 16:
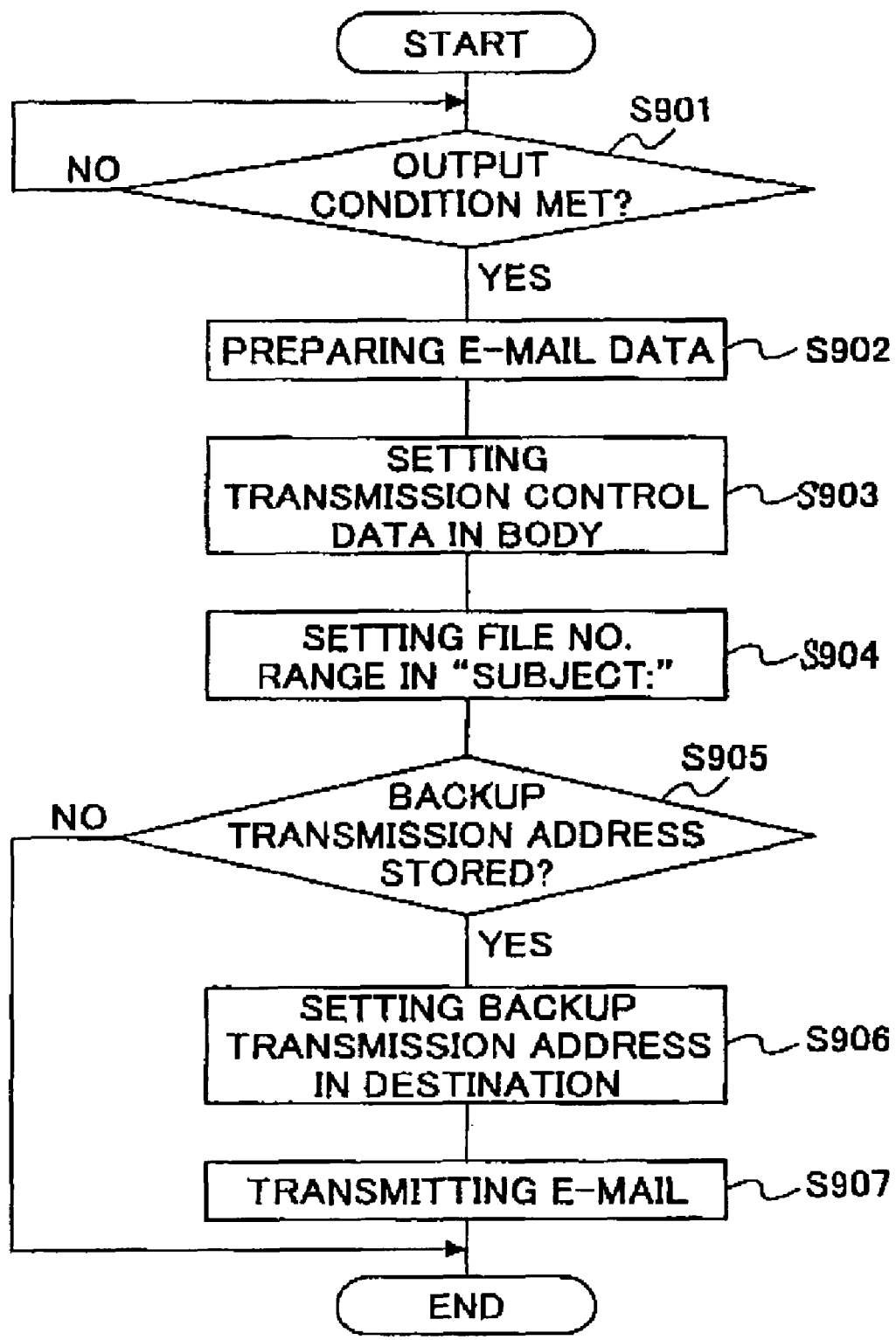
FIG. 16 is a flow diagram showing the backup transmission process in which a transmission control report is transmitted.

FIG. 16 shows an example of processing of this case.

At first, the network facsimile apparatus FX examines whether an output condition of a communication control report is met (step 901). When an output condition of a communication control report is met, the network facsimile apparatus FX prepares the e-mail data (step S902).

And, the network facsimile apparatus FX collects communication control data for a plurality of transmissions stored as communication history at the time and sets in the body of an e-mail (step S903), The network facsimile apparatus FX sets a range of file numbers of the communication control information prepared in the "Subject:" field (step S904).

Next, the network facsimile apparatus FX checks whether a backup transmission destination is stored in the parameter memory 13 beforehand (step S905). When an e-mail address of a backup destination is stored, the network facsimile apparatus FX sets an e-mail address of the backup transmission destination as the destination address of the prepared e-mail (step S906).

The network facsimile apparatus FX, after setting an e-mail address, transmits the e-mail data prepared as described above to the e-mail address and finishes processing (step S907).

Additionally, in step S905, when no e-mail address of a backup transmission destination is stored in the parameter memory 13, the network facsimile apparatus FX finishes processing without transmitting the e-mail.

By the way, in each embodiment above, the network facsimile apparatus FX transmits the e-mail to only one backup transmission destination stored beforehand. It is possible to address the backup transmission e-mail to the administrator, if applicable.

Additionally, it is possible to set a plurality of backup transmission destinations. In that case, it is preferable to designate, for example, a plurality of users registered as administrative members from the stand point of the control of the network facsimile apparatus FX.

As described above, the preferred embodiments of the present invention have been explained in detail. The present invention is not limited to the embodiments described above. It should be understood that various variations and modifications are possible without deviating from the scope of the present invention.

In summary, as described above, the network facsimile apparatus according to the present invention, when it transmits image information received as e-mail through a network to other facsimile apparatuses through a public line, stores an e-mail address of a backup transmission destination with respect to the facsimile transmission in a memory unit for storing e-mail addresses beforehand. When the facsimile transmission is completed, the network facsimile apparatus generates various communication information about the facsimile transmission as communication control information. The network facsimile apparatus prepares an e-mail message that includes the communication control information, and transmits the prepared e-mail to the e-mail address stored in the memory unit. A user can easily and readily ensure the result of the facsimile transmission by e-mail from the network facsimile apparatus. The network facsimile apparatus becomes useful.

In one aspect, the network facsimile apparatus, when it prepares the e-mail, converts the transmitted image information into a predetermined compression form and attaches the compressed image information to the e-mail. The user can identify the document that the user requested the network facsimile apparatus to transmit when the user receives the backup transmission e-mail. The network facsimile apparatus according to the present invention becomes more useful.

In another aspect, the network facsimile apparatus according to the present invention includes a phone number or an e-mail address of the facsimile destination in the "Subject:" field of the backup transmission e-mail. The user can control and manage the backup transmission e-mail surely and easily using the computer terminal at which the user requested the network facsimile apparatus for the facsimile transmission. The network facsimile apparatus becomes more useful.

In another aspect, the network facsimile apparatus according to the present invention prepares communication control data every time it performs a facsimile transmission. The communication control data are indicated in the "Subject:" field of the backup transmission e-mail as communication control information. Accordingly, the user can understand the results of the facsimile transmissions in more detail. The network facsimile apparatus becomes more convenient.

In another aspect, the network facsimile apparatus according to the present invention prepares communication control data every time it performs a facsimile transmission. The communication control data are indicated in the body of the backup transmission e-mail as communication control information. Accordingly, the network facsimile apparatus can transmit e-mail that describes the communication control information in more detail, and becomes much more useful and convenient.

In another aspect, the network facsimile apparatus according to the present invention prepares a communication result report every time it performs a facsimile transmission. The communication result report is included in the body or the "Subject:" field of the backup transmission e-mail. The communication result report is usually prepared by the facsimile apparatus every time it performs a facsimile transmission even if it is not required to transmit a backup transmission e-mail message. Since the communication result report is prepared whether it is required or not, the network facsimile apparatus can prepare the communication control information easily and at low cost. As a result, the network facsimile apparatus becomes convenient and cost effective.

In another aspect, the network facsimile apparatus according to the present invention prepares e-mail that contains only the communication control information in its body. Since the e-mail contains only the communication control information, the size of the e-mail can be reduced. Accordingly, the e-mail becomes easy to transmit between the network facsimile apparatus and a computer terminal. The control of e-mail also becomes simple and easy. The network facsimile apparatus becomes more useful.

In another aspect, the network facsimile apparatus according to the present invention stores communication control information of the facsimile transmission in the memory unit every time it performs a facsimile transmission. When the number of the facsimile transmissions of which communication control information is stored in the memory unit reaches a predetermined number, a backup transmission e-mail message that contains the communication control information is prepared and transmitted. The network facsimile apparatus can reduce the number of e-mail transmissions and accordingly reduce traffic in the network. The present invention can improve a network facsimile apparatus and make the network to which the network facsimile apparatus is connected useful.

In another aspect, the network facsimile apparatus according to the present invention stores an e-mail address of a backup destination to which error information is to be transmitted when a communication error occurs in a facsimile transmission. When a communication error occurs in a facsimile transmission, the network facsimile apparatus analyzes the error level of the communication error that occurred. When the error level that is determined by the network facsimile apparatus is a predetermined error level, an error report is indicated in the body of the backup transmission e-mail, and a file number of the facsimile transmission in which the communication error has occurred and the category of error are indicated in the "Subject:" field of the backup transmission e-mail. The prepared backup transmission e-mail is transmitted to the e-mail address stored as an e-mail address to which such transmission error report is to be sent. The network facsimile apparatus can surely inform the user of the occurrence of a major error by ignoring the occurrence of a minor error such as "line busy". The user can control or manage important information adequately and easily. The network facsimile apparatus becomes more useful.

In another aspect, the network facsimile apparatus according to the present invention can store an e-mail address of a backup destination, of error information corresponding to every error level of communication errors of the facsimile transmission. The network facsimile apparatus transmits the e-mail to an e-mail address, among the e-mail addresses stored in the network facsimile apparatus, corresponding to the error level determined by the network facsimile apparatus. The network facsimile apparatus can inform the right operator of the occurrence of a transmission error, depending on the error level determined by the network facsimile apparatus, for appropriate countermeasure. The user can manage the error information more adequately as well. The network facsimile apparatus becomes more convenient.

In another aspect, the network facsimile apparatus according to the present invention can store therein a plurality of e-mail addresses to which a backup transmission e-mail message indicating transmission error information with respect to a facsimile transmission is sent. The backup transmission e-mail message prepared by the network facsimile apparatus is transmitted to the plurality of e-mail addresses stored therein. In the case where a plurality of administrators are involved, the backup transmission e-mail is easily transmitted to the plurality of addresses necessary for the administrators to receive the e-mail. The network facsimile apparatus becomes more useful by controlling error information appropriately.

Examples and exemplary embodiments of the present invention are described above. The present invention is not limited to these embodiments, but various variations and modifications may be made without departing from the scope of the present disclosure and the appended claims.

This patent application is based on Japanese priority patent application No. 2001-183700 filed on Jun. 18, 2001, and No. 2002-063330 filed on Mar. 8, 2002, the entire contents of which are hereby incorporated by reference.

What is claimed is:

1. A network facsimile apparatus comprising:
a network interface unit configured to receive image information through a computer network as a file attached to an e-mail message;
a facsimile interface unit configured to transmit said image information received by said network interface unit through said computer network as said file attached to said e-mail message, to another facsimile apparatus through a public channel in compliance with a facsimile transmission procedure;
a memory unit configured to store an e-mail address inputted before the receipt of the image information by said network interface unit;
a control unit configured to create, after the facsimile interface unit transmits the image information, a backup transmission e-mail message containing communication control information indicating a result of the facsimile transmission and, as an attachment to said backup transmission e-mail message, a compressed image corresponding to said image information transmitted by facsimile transmission to the other facsimile apparatus through said public channel, and transmits said backup transmission e-mail message through said computer network to said e-mail address inputted before the receipt of the image information by said network interface unit,
wherein said e-mail address to which said backup transmission e-mail message is transmitted does not correspond to said another facsimile apparatus to which said image information is transmitted by the facsimile transmission procedure.

2. The network facsimile apparatus as claimed in claim 1, wherein said control unit further stores an e-mail address of an administrator in said memory unit and transmits said backup transmission e-mail message to said e-mail address of said administrator.

3. The network facsimile apparatus as claimed in claim 1, wherein said control unit stores, in said memory unit, a plurality of e-mail addresses to which the backup transmission e-mail message is to be transmitted and transmits said backup transmission e-mail message to the plurality of e-mail addresses through said computer network.

4. The network facsimile apparatus as claimed in claim 1, wherein said control unit indicates one of phone number and e-mail address of the other facsimile apparatus to which said image information has been transmitted in a "Subject:" field of said backup transmission e-mail message when said control unit prepares said backup transmission e-mail message.

5. The network facsimile apparatus as claimed in claim 1, wherein said control unit indicates, after a plurality of facsimile transmissions through said public channel are performed, said communication control information with respect to the plurality of facsimile transmissions in a "Subject:" field of said backup transmission e-mail message when said control unit prepares said backup transmission e-mail message.

6. The network facsimile apparatus as claimed in claim 1, wherein said control unit, in response to each facsimile transmission, creates communication control information and prepares said backup transmission e-mail message containing said communication control information in the body of said backup transmission e-mail message.

7. The network facsimile apparatus as claimed in claim 1, wherein said control unit creates a transmission result report for every facsimile transmission and prepares said backup transmission e-mail message containing said transmission result report as said communication control information in one of the body and the "Subject:" field of the backup transmission e-mail message.

8. The network facsimile apparatus as claimed in claim 1, wherein said backup transmission e-mail message only contains said communication control information in the body of said backup transmission e-mail message.

9. The network facsimile apparatus as claimed in claim 1, wherein said control unit converts said communication control information into a predetermined format and prepares said backup transmission e-mail message containing the converted communication control information in the body of said backup transmission e-mail message.

10. The network facsimile apparatus as claimed in claim 1, wherein said control unit, in response to each facsimile transmission, creates communication control information, accumulates said communication control information in said memory unit, prepares, after the number of facsimile transmissions that have been performed reaches a predetermined number, said backup transmission e-mail message containing all the communication control information accumulated in said memory unit, and transmits said backup transmission e-mail message to said e-mail address stored in said memory unit through said computer network.

11. The network facsimile apparatus claimed in claim 1, wherein said control unit, in response to each facsimile transmission, creates communication control information, accumulates said communication control information in said memory unit, and prepares, when a predetermined condition to prepare said backup transmission e-mail message is met, said backup transmission e-mail message, and transmits said backup transmission e-mail message to said e-mail address stored in said memory unit through said computer network.

12. The network facsimile apparatus as claimed in claim 1, wherein said control unit further stores, in said memory unit, an e-mail address to which an error information e-mail message containing error information is to be transmitted, identifies an error level of a transmission error in response to an occurrence of said transmission error, prepares said error information e-mail message indicating an error report with respect to said transmission error in the body of the error information e-mail message and a file number of said facsimile transmission and a category of said transmission error in a "Subject:" field if the identified error level matches a predetermined error level, and transmits said error information e-mail message to said e-mail address stored in said memory unit.

13. The network facsimile apparatus as claimed in claim 12, wherein
a plurality of e-mail addresses are stored in said memory unit, each e-mail address corresponding to one of the error levels; and
said error information e-mail message is transmitted to the one of the e-mail addresses corresponding to the error level of said transmission error.

14. The network facsimile apparatus as claimed in claim 12, wherein
a plurality of e-mail addresses to which the error information e-mail message is to be transmitted are stored in said memory unit; and
said error information e-mail message is transmitted to the plurality of e-mail addresses.

15. The network facsimile apparatus as claimed in claim 1, wherein said e-mail address stored in said memory unit corresponds to a destination prespecified before the receipt of the image information by said network interface unit, and the backup transmission e-mail message containing said communication control information is transmitted to the e-mail address through said computer network.

16. A network facsimile apparatus having a network function for exchanging data through a computer network as well as a facsimile function for exchanging facsimile data through a public communication channel in compliance with a facsimile transmission procedure, comprising:
a network interface unit through which image information as a file attachment to an e-mail message is received via said computer network;
a facsimile interface unit through which a facsimile corresponding to said image information received through said computer network as said file attached to said e-mail message, is transmitted to another facsimile apparatus via said public communication channel in compliance with said facsimile transmission procedure;
e-mail address storage means which stores an e-mail address input prior to the receipt of the image information through said network interface unit;
a control unit configured to prepare, after the facsimile interface unit transmits the image information, a backup transmission e-mail message containing communication control information indicating a result of the facsimile transmission and, as an attachment to said a backup transmission e-mail message, a compressed image corresponding to said image information transmitted by facsimile transmission to the other facsimile apparatus through said public communication channel, in response to the transmission of said facsimile corresponding to the image information to the other facsimile apparatus through said public communication channel, and transmit said backup transmission e-mail message to said e-mail address through said computer network,
wherein said e-mail address to which said backup transmission e-mail message is transmitted does not correspond to said another facsimile apparatus to which said image information is transmitted by the facsimile transmission procedure.

17. A network facsimile apparatus having a network function for exchanging data through a computer network and a facsimile function for exchanging facsimile data in compliance with a predetermined facsimile procedure through a public channel, wherein said network facsimile apparatus transmits, to a facsimile destination through said public channel, image information contained in an e-mail message received through said computer network, comprising:
an e-mail address storage part configured to store a backup transmission e-mail address to which a backup transmission e-mail message is to be transmitted, the e-mail address being inputted before the receipt of the e-mail message containing the image information through said computer network; and
a control part configured to prepare, after the facsimile interface unit transmits the image information, said backup transmission e-mail message corresponding to the facsimile transmission of said image information to said facsimile destination, add (a) communication control information indicating a result of said facsimile transmission of said image information to said facsimile destination and (b) a phone number of said facsimile destination, to a subject field of said backup transmission e-mail message, and transmit said backup transmission e-mail message to said backup transmission e-mail address stored in said e-mail address storage part, in response to completion of the facsimile transmission,
wherein said backup transmission e-mail address to which said backup transmission e-mail message is transmitted does not correspond to said another facsimile apparatus to which said image information is transmitted by the predetermined facsimile procedure through a public channel.

18. The network facsimile apparatus as claimed in claim 17, wherein said communication control information added to the subject field of said backup transmission e-mail message includes date and time of said facsimile transmission of said image information to said facsimile destination.

19. The network facsimile apparatus as claimed in claim 17, wherein said communication control information added to the subject field of said backup transmission e-mail message includes a result of said facsimile transmission of said image information to said facsimile destination.

20. The network facsimile apparatus as claimed in claim 17, wherein said communication control information added to the subject field of said backup transmission e-mail message includes a destination name of said facsimile destination.

21. The network facsimile apparatus of claim 1, wherein in an event that said facsimile transmission contains errors or is not received by said another facsimile apparatus, said control unit transmits said backup e-mail transmission to an e-mail address corresponding to said another facsimile apparatus.

22. The network facsimile apparatus of claim 1, wherein the apparatus transmits said backup transmission e-mail message through said computer network only when it is determined that said facsimile transmission of said image information to said another facsimile apparatus through a public channel is successful.

* * * * *